US009229297B2

(12) United States Patent
Chao

(10) Patent No.: US 9,229,297 B2
(45) Date of Patent: Jan. 5, 2016

(54) RING STRUCTURE FOR REDUCING FLASH GLARE AND A MANUFACTURING METHOD THEREOF

(71) Applicant: GETAC TECHNOLOGY CORPORATION, Hsinchu County (TW)

(72) Inventor: Po-Tsun Chao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 14/518,848

(22) Filed: Oct. 20, 2014

(65) Prior Publication Data

US 2015/0168807 A1 Jun. 18, 2015

Related U.S. Application Data

(60) Provisional application No. 61/917,519, filed on Dec. 18, 2013.

(30) Foreign Application Priority Data

Apr. 2, 2014 (CN) .......................... 2014 1 0129496

(51) Int. Cl.
*G03B 11/04* (2006.01)
*H04N 5/225* (2006.01)
*B29C 45/14* (2006.01)

(52) U.S. Cl.
CPC .............. *G03B 11/045* (2013.01); *B29C 45/14* (2013.01); *B29C 45/14336* (2013.01); *H04N 5/2251* (2013.01)

(58) Field of Classification Search
CPC . G03B 11/045; H04N 5/2251; H04N 5/2257; B29C 45/14336; B29C 45/14; A45C 11/38; A45F 2200/0533; Y10S 224/908; Y10S 292/48; Y10S 294/139; H04M 1/0264; H04M 2250/20; G02B 13/001; H01L 27/14618; H01L 348/374
See application file for complete search history.

(56) References Cited

U.S. PATENT DOCUMENTS 6,088,541 A * 7/2000 Meyer ................... G03B 15/05
396/155
2011/0267583 A1* 11/2011 Hayashi ............ G01B 9/02028
351/206

* cited by examiner

Primary Examiner — Mekonnen Dagnew

(57) ABSTRACT

A ring structure for reducing flash glare and a manufacturing method thereof are provided. The ring structure for reducing flash glare is assembled on a camera module with a lens and a flashlight and includes a transparent substrate and a shading plate. The flashlight and the lens are fully separated by the shading plate to prevent light rays of the flashlight from interfering with the lens through the transparent substrate. The manufacturing method includes: providing a transparent substrate; forming a C-shaped hole on the transparent substrate; and injecting a plastic to fill the C-shaped hole and thereby form a shading plate on the transparent substrate. The manufacturing method entails performing a processing process on the transparent substrate directly and forming the shading plate by injection molding to not only simplify the manufacturing process but also makes the ring structure waterproof.

11 Claims, 9 Drawing Sheets

RING STRUCTURE FOR REDUCING FLASH GLARE AND A MANUFACTURING METHOD THEREOF

BACKGROUND OF THE INVENTION

1. Field of the Invention

The present invention relates to ring structures for reducing flash glare, and more particularly, to a ring structure for reducing flash glare and for use with a waterproof cellular phone casing and a manufacturing method of the same.

2. Description of the Prior Art

To block light rays emitted from a flashlight, a camera lens of a cellular phone is characterized in that an annular black shading element is mounted in front of the lens to serve as a shading structure and thus prevent the flashlight from compromising the operation of the camera lens. However, if a user mounts a transparent protective casing on the cellular phone from outside and the protective casing does not have any through hole corresponding in position to the camera lens and the flashlight, a portion of the light rays emitted from the flashlight will be reflected off the transparent protective casing and thus admitted into the camera lens, thereby compromising the quality of images taken by the camera lens.

Furthermore, to make it practicable for cellular phones to take pictures or shoot videos in water, transparent plastic casings which enclose cellular phones fully and transparent pouchlike protective bags are available in the market. Hence, it is of vital importance that the protective casings and the protective bags are waterproof. The protective bags cannot be fitted around the cellular phone snugly; as a result, if a cellular phone contained in a protective bag takes pictures in the presence of a flashlight in operation, light rays emitted from the flashlight will be reflected off or refracted by the protective bag to thereby interfere with the camera lens.

With the transparent plastic casings being likely to pose interference-related problems, such as reflection and refraction, a conventional transparent plastic casing has a penetrating hole and a shading structure, wherein the penetrating hole corresponds in position to the camera lens, and the shading structure has a cylinder or a shading wall, such that the shading structure surrounds the camera lens or the flashlight to prevent the flashlight from interfering with the camera lens in the course of picture taking.

However, the shading structure has to be manufactured independently before being mounted on the casing and thus is not waterproof—because its manufacturing process entails manufacturing two elements and then putting the two elements together. To render the shading structure waterproof, the two elements must have a tight fit which in turn depends on high precision and thus least errors in the dimensions of the two elements manufactured. This goal, however, can only be achieved at the expense of high manufacturing costs and intricate manufacturing process.

SUMMARY OF THE INVENTION

In view of this, the present invention provides a manufacturing method of a ring structure for reducing flash glare. The present invention further provides a ring structure for reducing flash glare. The ring structure is assembled on a camera module with a lens and a flashlight. The manufacturing method of a ring structure for reducing flash glare comprises the steps of: providing a transparent substrate; forming a C-shaped hole on the transparent substrate; and injecting a plastic to fill the C-shaped hole and thereby form a shading plate on the transparent substrate. The C-shaped hole has a pass extending away from the flashlight to prevent the flashlight in operation from interfering optically with the lens of the camera module.

To form the ring structure for reducing flash glare, it is necessary to form the C-shaped hole on the transparent substrate directly and then inject a plastic to fill the C-shaped hole and thereby form the shading plate, such that the shading plate prevents the flashlight in operation from interfering with the lens of the camera module. There are two reasons why the C-shaped hole rather than a through hole is formed, namely, first, the transparent substrate functions as a lens for hiding the lens, second, being not entirely disconnected from the transparent substrate proper, the lens-portion of the transparent substrate does not need to be positioned anew. Moreover, since the manufacturing process does not entail manufacturing another element and then mounting the element on the transparent substrate, the manufacturing process not only dispenses with the manufacturing of the element but is also simplified. Furthermore, with the C-shaped hole being filled with a plastic, not only is the shading element manufactured and positioned simultaneously, but the C-shaped hole is also made waterproof.

The present invention further provides a ring structure for reducing flash glare. The ring structure is assembled on a camera module with a lens and a flashlight. The ring structure for reducing flash glare comprises a transparent substrate and a shading plate. The transparent substrate has a C-shaped hole. The C-shaped hole corresponds in position to the lens and surrounds the lens. The C-shaped hole has a pass extending away from the flashlight. The shading plate has a through hole and a C-shaped flange. The C-shaped flange is disposed at the rim of the through hole. The C-shaped flange corresponds in dimensions to the C-shaped hole to not only be received in the C-shaped hole but also fix the shading plate to the transparent substrate. The through hole is of larger dimensions than the lens. The shading plate is positioned beside the flashlight as soon as the ring structure for reducing flash glare is assembled.

With the C-shaped hole surrounding the lens, and the shading plate being positioned beside the flashlight as soon as the ring structure for reducing flash glare is assembled, the C-shaped hole is filled fully with the C-shaped flange of the shading plate when the C-shaped flange of the shading plate is received in the C-shaped hole, such that the shading plate blocks light between the lens and the flashlight. To prevent the flashlight from interfering with the lens, the C-shaped hole has a pass extending away from the flashlight, such that the flashlight and the lens are fully separated by the shading plate. If the pass of the C-shaped hole extends toward the flashlight, the light rays of the flashlight will interfere with the lens through the transparent substrate.

Given the manufacturing method and the structures thus manufactured, the ring structure for reducing flash glare of the present invention is advantageously characterized in that: a processing process is performed directly on the transparent substrate; the shading plate is formed by means of injection molding as disclosed in the prior art; and thus not only is the manufacturing process simplified, but the structures are also rendered waterproof. There are two reasons why the C-shaped hole is required, namely, first, the transparent substrate functions as a lens for hiding the lens, second, being not entirely disconnected from the transparent substrate proper, the lens-portion of the transparent substrate does not need to be positioned anew, thereby enhancing ease of production. The C-shaped flange of the shading plate is received in the C-shaped hole, and thus the flashlight and the lens are fully separated by the C-shaped flange, so as to prevent the flashlight from interfering with the lens.

The fine structures and advantages of the present invention are sufficiently illustrated with embodiments below to allow persons skilled in the art to gain insight into the technical contents of the present invention and implement the present invention accordingly. Furthermore, persons skilled in the art readily understand related objectives and advantages of the present invention by making reference to the disclosure contained in the specification, claims, and drawings of the present invention.

DETAILED DESCRIPTION OF THE EMBODIMENTS

Figure 1:
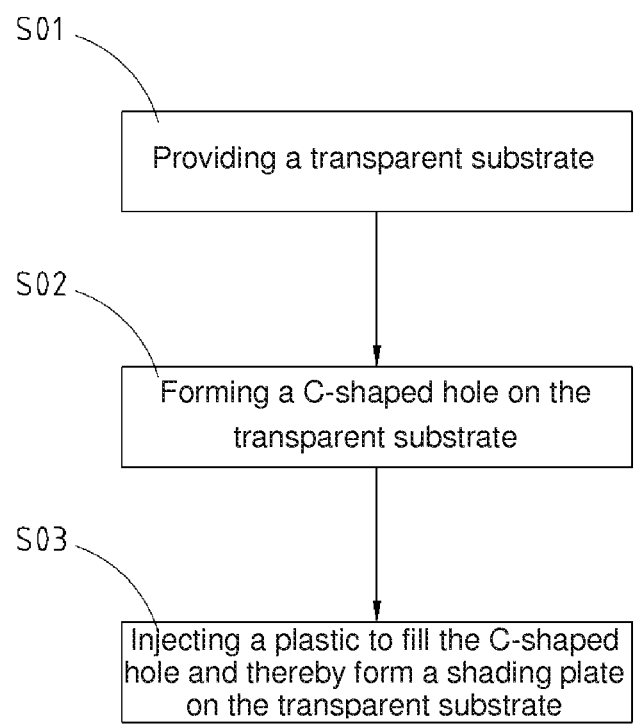
FIG. 1 is flow chart (1) of a manufacturing method of a ring structure for reducing flash glare according to the first embodiment of the present invention.
Figure 2:
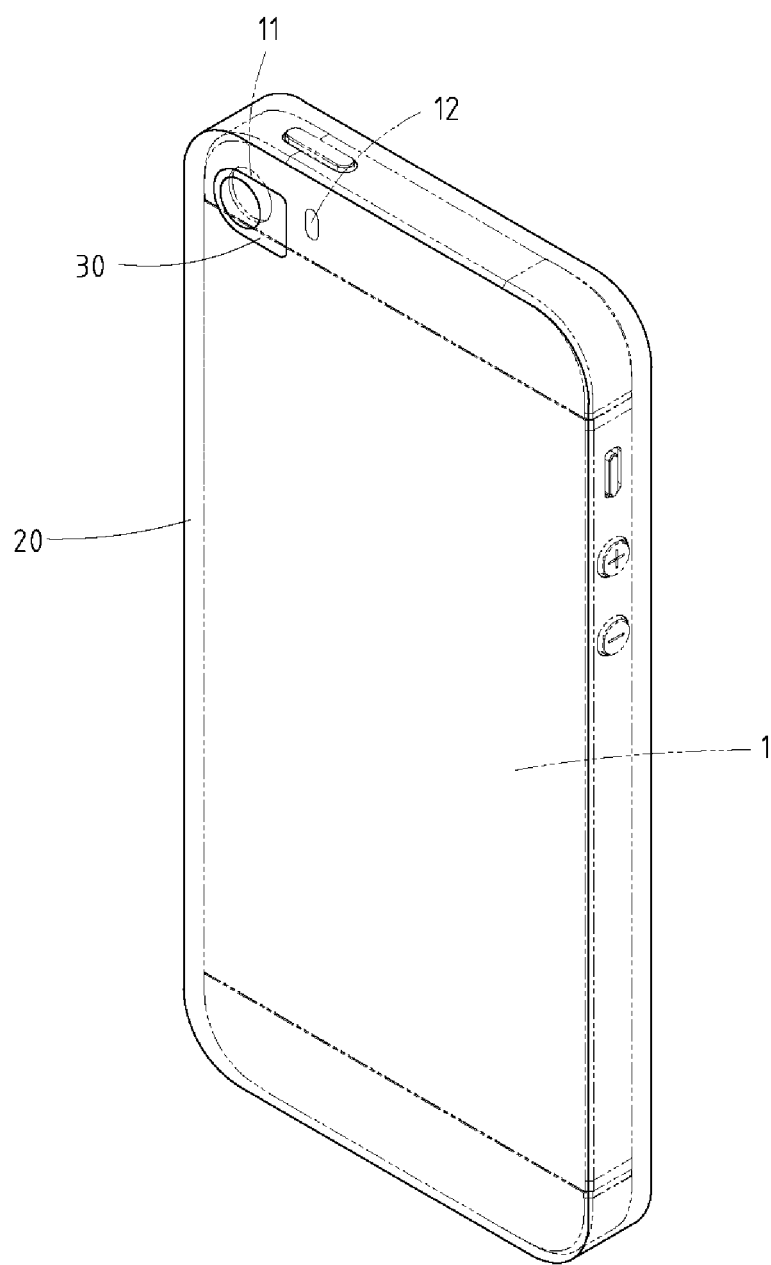
FIG. 2 is a schematic view of a mobile device equipped with a waterproof protective casing according to the first embodiment of the present invention.
Figure 3:
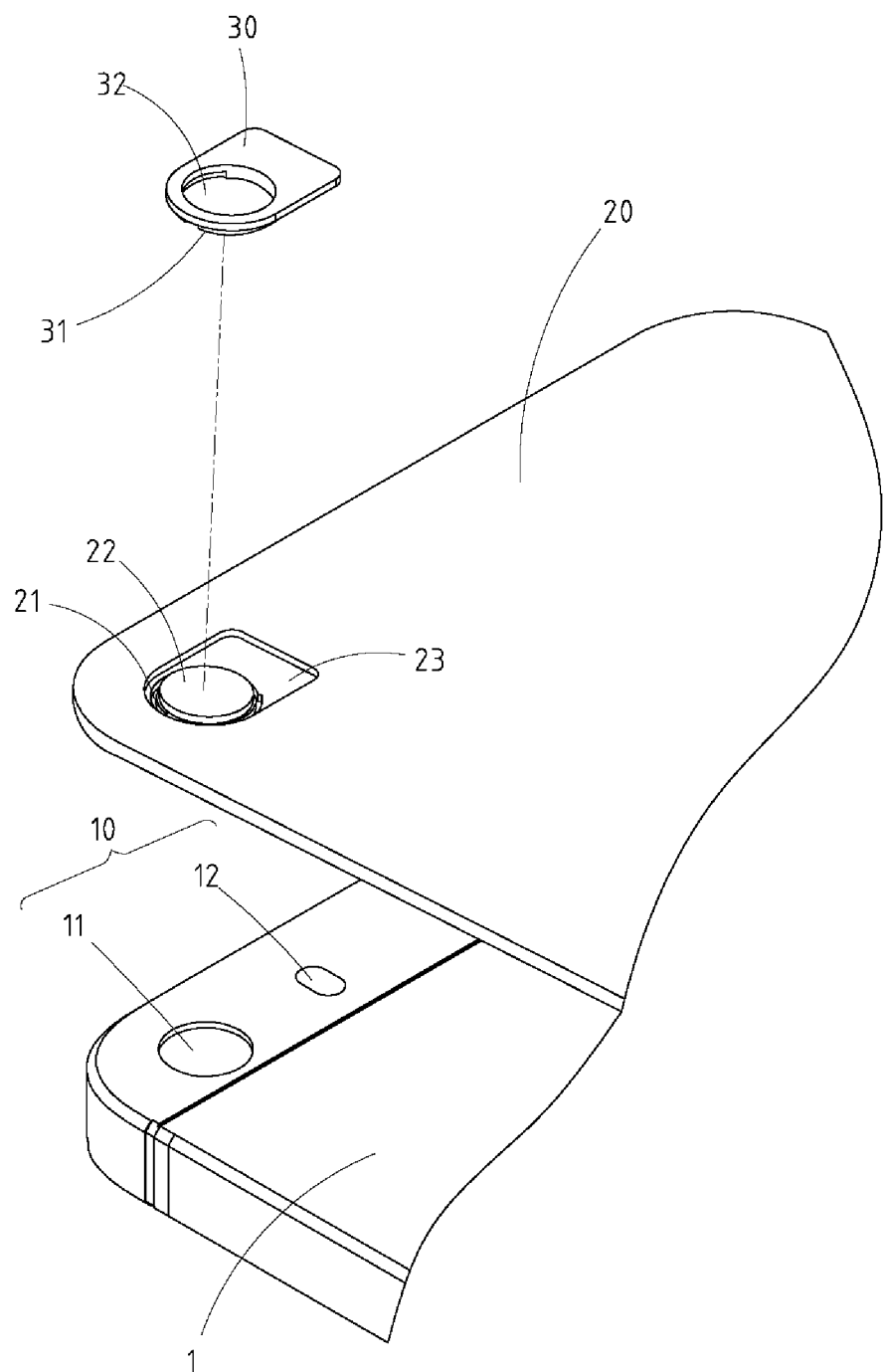
FIG. 3 is an exploded view of the ring structure for reducing flash glare according to the first embodiment of the present invention.
Figure 4:
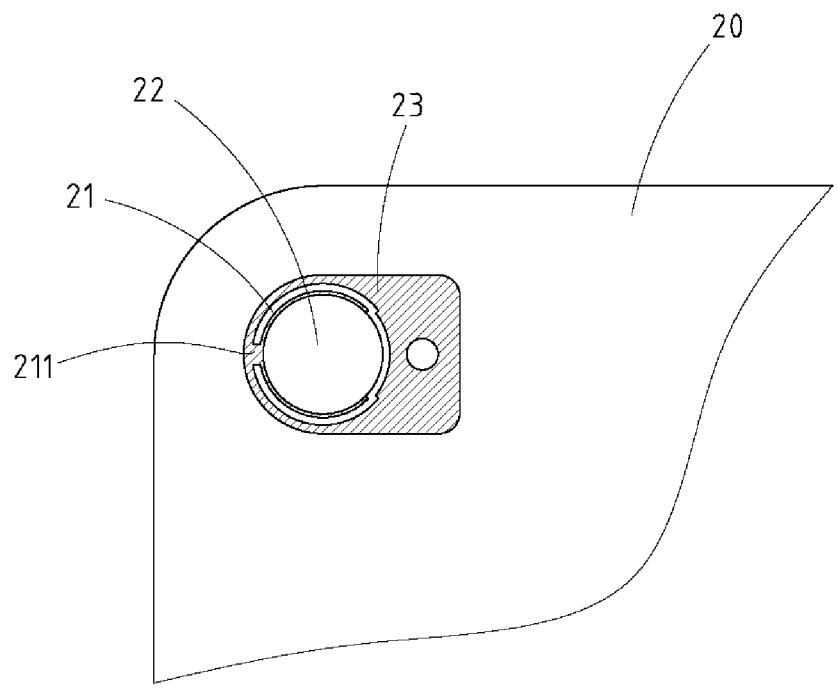
FIG. 4 is a top view of a transparent substrate according to the first embodiment of the present invention.

FIG. 1 is flow chart (1) of a manufacturing method of a ring structure for reducing flash glare according to the first embodiment of the present invention. FIG. 2 is a schematic view of a mobile device equipped with a waterproof protective casing according to the first embodiment of the present invention. FIG. 3 is an exploded view of the ring structure for reducing flash glare according to the first embodiment of the present invention. FIG. 4 is a top view of a transparent substrate according to the first embodiment of the present invention. Referring to FIG. 1 through FIG. 4, the present invention provides a manufacturing method of a ring structure for reducing flash glare, and the manufacturing method is applicable to a camera module 10 with a lens 11 and a flashlight 12. The manufacturing method comprises the steps as follows:

Step S01: providing a transparent substrate.

A portion of the substrate functions directly as a lens for use with a lens 11, and thus the lens-portion of the substrate must be transparent. To make the manufacturing process simple, it is practicable that a transparent substrate 20 which is fully transparent serves as the substrate, and that the transparent substrate 20 is of an area substantially equal to the area of the rear side of a mobile device 1 equipped with the camera module 10. Moreover, as the conventional cellular phones look increasingly stylish, to ensure that the cellular phone proper is visible, it is necessary that the transparent substrate 20 prevents the cellular phone from being hidden. However, the aforesaid embodiment is not restrictive of the present invention. The present invention will work, provided that, after the transparent substrate 20 has been assembled on the mobile device 1 with the camera module 10, a portion of the transparent substrate 20 corresponds in position to the camera module 10 and is transparent.

Step S02: forming a C-shaped hole on a transparent substrate.

In this step, a C-shaped hole 21 is formed on the transparent substrate 20 with a computer numerical control (CNC). Referring to FIG. 2 through FIG. 4, the C-shaped hole 21 corresponds in position to the lens 11, such that the C-shaped hole 21 surrounds the lens 11. To prevent light rays of the flashlight 12 from traveling along a pass 211 of the C-shaped hole 21, which is still a portion of the transparent substrate 20, and thus interfering with the lens 11, the pass 211 must extend away from the flashlight 12. In this embodiment, the flashlight 12 of the camera module 10 is located to the right of the lens 11; hence, if the pass 211 of the C-shaped hole 21 extends away from the flashlight 12, as indicated by the angle of depression in FIG. 4, the pass 211 of the C-shaped hole 21 will have to extend leftward, as shown in FIG. 4.

Step S03: injecting a plastic to fill a C-shaped hole and thereby form a shading plate on the transparent substrate.

In this embodiment, the waterproof box structure manufacturing method entails injecting, by means of insert molding, a plastic to fill the C-shaped hole formed in step S02. Referring to FIG. 3, a shading plate 30 is separated from the transparent substrate 20 for the sake of schematic illustration of the shading plate 30; hence, it is simply not true that the waterproof box structure manufacturing method entails forming the shading plate 30 and then mounting the shading plate 30 on the transparent substrate 20. Since a C-shaped hole 21 is formed in step S02, when a plastic is injected by insert molding, the C-shaped hole 21 and its vicinity is filled with the plastic so as to form the shading plate 30 shown in FIG. 3.

Referring to FIG. 2, the ring structure for reducing flash glare, as manufactured by steps S01 through S03, is assembled on the mobile device 1 of the camera module 10 with the lens 11 and the flashlight 12, and the C-shaped hole 21 corresponds in position to the lens 11 such that the C-shaped hole 21 surrounds the lens 11. Furthermore, the shading plate 30 is positioned beside the flashlight 12. At this point in time, the shading plate 30, which fills the C-shaped hole 21, hides the vicinity of the lens 11. Hence, light rays emitted from the flashlight 12 travel toward the lens 11 through the transparent substrate 20 but are blocked by the shading plate 30 and thus do not interfere with the lens 11. Hence, in the course of picture taking, the flashlight 12 is unlikely to interfere with the lens 11 in the presence of the protective casing.

Moreover, the manufacturing process of the present invention does not entail manufacturing an element and then mounting the element on the transparent substrate 20; instead, the manufacturing process of the present invention entails performing a processing process on the transparent substrate 20 directly and forming the shading plate 30 by insert molding. Hence, the manufacturing process of the present invention dispenses with the processes of manufacturing and mounting the element, reduces the element manufacturing costs and inventory, and simplifies the manufacturing and mounting processes. Furthermore, referring to FIG. 2, when the present invention is applied to the protective casing for preventing water from intruding into the cellular phone, the C-shaped hole 21 is filled with a plastic to ensure that the C-shaped hole 21 is waterproof. By contrast, related prior art has the following drawbacks: a penetrating hole is formed in the substrate to penetrate the substrate, and then a shading structure with a cylinder or a shading wall is mounted on the substrate; when assembled, the aforesaid two elements are not tightly fitted to each other or are likely to get loosened from each other after long use, due to an error; as a result, the substrate is no longer waterproof, and in consequence the protective casing is not waterproof neither.

Figure 5:
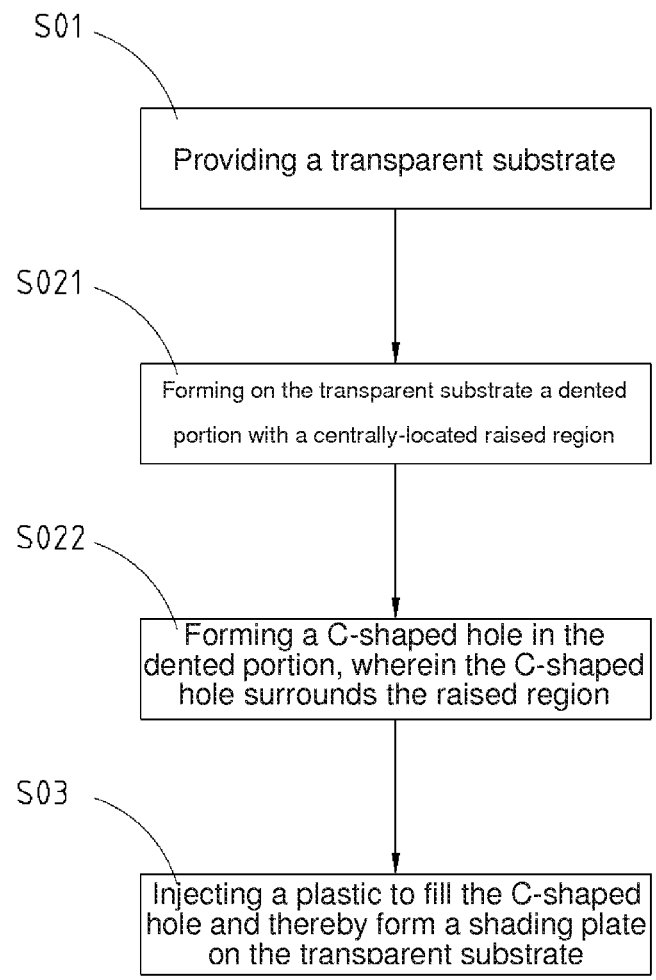
FIG. 5 is flow chart (2) of a manufacturing method of a ring structure for reducing flash glare according to the first embodiment of the present invention.
Figure 6:
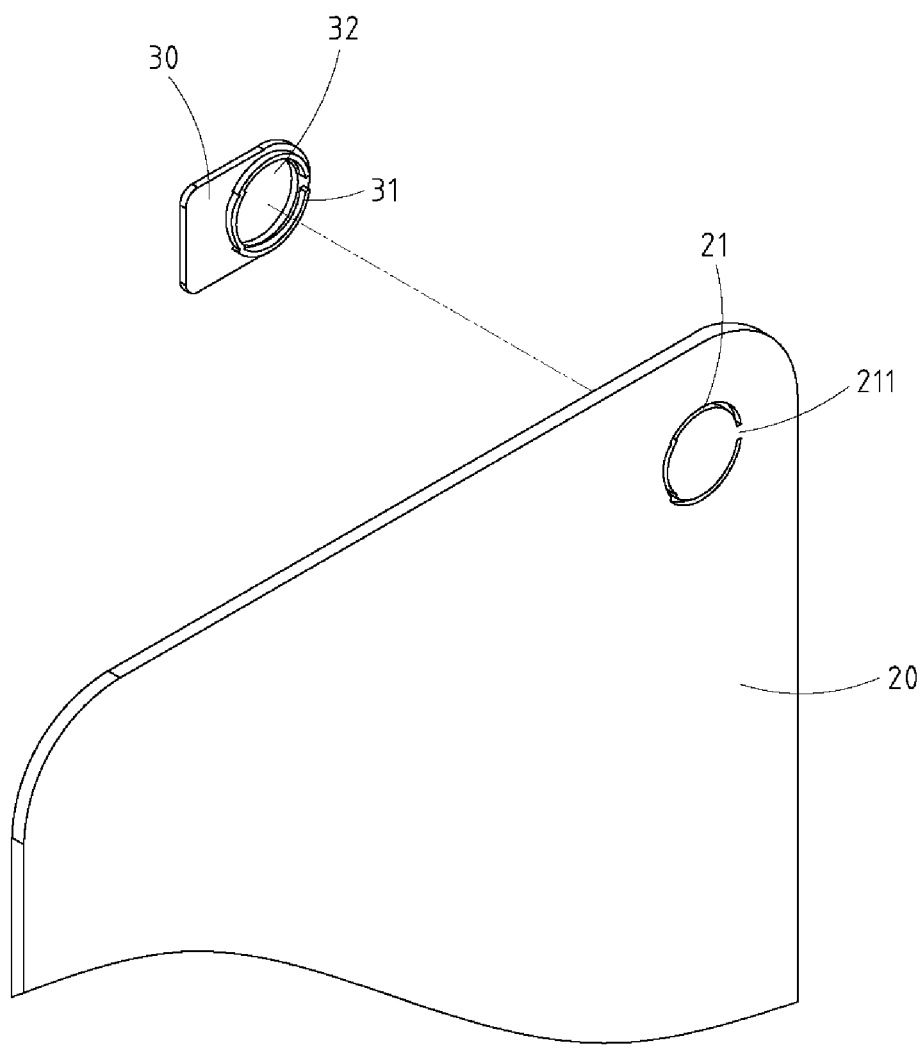
FIG. 6 is a rear exploded view of the ring structure for reducing flash glare according to the first embodiment of the present invention.

Referring to FIG. 5 and FIG. 6, there are shown in FIG. 5 flow chart (2) of a manufacturing method of a ring structure for reducing flash glare according to the first embodiment of the present invention, and in FIG. 6 a rear exploded view of the ring structure for reducing flash glare according to the first embodiment of the present invention. In this embodiment, step S02 of a manufacturing method of a ring structure for reducing flash glare further comprises the steps as follows:

Step S021: forming on the transparent substrate a dented portion with a centrally-located raised region.

Referring to FIG. 3, a dented portion 23 with a centrally-located raised region 22 is formed on the transparent substrate 20 by the CNC. The raised region 22 corresponds in position to the lens 11 as soon as the transparent substrate 20 is assembled on the mobile device 1. Hence, the present invention is advantageously characterized in that a lens for hiding the lens 11 is made of the same transparent material as the transparent substrate and thus dispenses with the need to manufacture a lens element for use in hiding the lens 11. The dented portion 23 is of an appropriate size to surround the raised region 22 but not to correspond in position to the flashlight 12. In this embodiment, the area covered by the dented portion 23 is hatched as shown in FIG. 3.

Step S022: forming a C-shaped hole in the dented portion, wherein the C-shaped hole surrounds the raised region.

Step S022 entails forming a C-shaped hole 21 in the dented portion 23 in a manner that the C-shaped hole 21 surrounds the raised region 22. With the raised region 22 corresponding in position to the lens 11, and the C-shaped hole 21 being filled with a plastic in a subsequent step to form the shading plate 30 and thus block the lens 11 from the light rays emitted from the flashlight 12, the C-shaped hole 21 must surround the raised region 22 such that the shading plate 30 formed from the filling plastic blocks light in the vicinity of the lens 11. Furthermore, to ensure that light rays of the flashlight 12 do not interfere with the lens 11 through the transparent substrate 20, as shown in FIG. 6, the C-shaped hole 21 must penetrate the transparent substrate 20. Also, to avoid the hassles of positioning the raised region 22 anew, step S022 involves forming the C-shaped hole 21 rather than an O-shaped through hole for surrounding the lens 11 entirely, such that the raised region 22 is connected to the dented portion 23 through the pass 211 of the C-shaped hole 21.

To prevent light rays of the flashlight 12 from traveling along the pass 211, which is still a portion of the transparent substrate 20, and thus interfering with the lens 11, the pass 211 of the C-shaped hole 21 must extend away from the flashlight 12. Hence, the pass 211 serves two purposes, namely connecting the raised region 22 and the transparent substrate 20, and preventing light rays of the flashlight 12 from traveling along the pass 211 to interfere with the lens 11.

Step S022 is followed by step S03. Step S03 entails injecting a plastic to fill a C-shaped hole and thereby form a shading plate on the transparent substrate. The plastic fills the C-shaped hole 21 and the dented portion 23 except the raised region 22, such that the position-limiting effect of the C-shaped hole 21, the raised region 22 and the dented portion 23 facilitates the formation of the shading plate 30. Referring to FIG. 3 and FIG. 6, upon completion of the filling process of the plastic, the plastic is confined to the C-shaped hole 21, the raised region 22 and the dented portion 23, such that the shading plate 30 forms a C-shaped flange 31 and a through hole 32. The shading plate 30 corresponds in shape to the dented portion 23 and is received in the dented portion 23. The C-shaped flange 31 corresponds in shape and dimensions to the C-shaped hole 21 and is aligned with the C-shaped hole 21, such that the C-shaped flange 31 is received in the C-shaped hole 21 to fix the shading plate 30 to the transparent substrate 20. The through hole 32 corresponds in position to and fits tightly with the raised region 22 from outside. The through hole 32 is of larger dimensions than the lens 11. That is to say, the through hole 32 is of a larger diameter than the lens 11.

The present invention makes good use of the difference in height between the raised region 22 and the dented portion 23 and their position-limiting effect and thus confines the filling plastic to a specific area; hence, the present invention dispenses with the hassles of demarcating a plastic filling area with a die or by any other manufacturing process. With the C-shaped hole 21 surrounding the raised region 22, the plastic can surround the raised region 22 certainly and fully, such that the lens 11 is well-protected circumferentially to minimize the interference from the light rays emitted from the flashlight 12.

Figure 7:
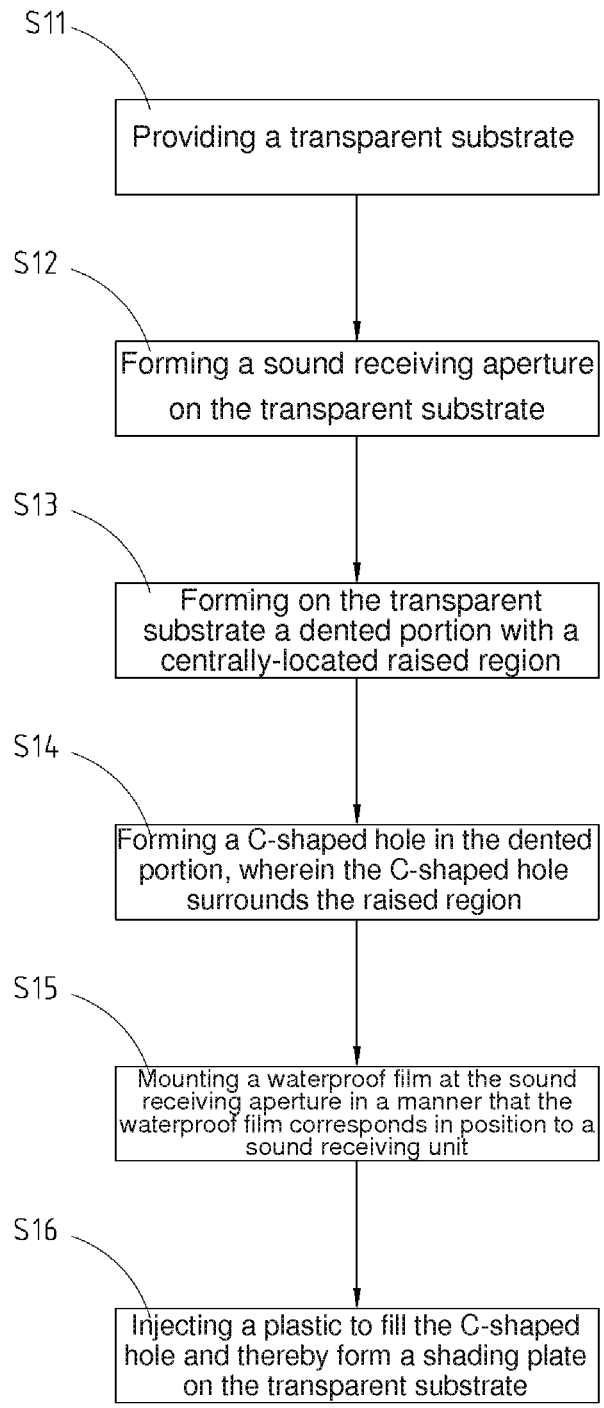
FIG. 7 is a flow chart of a manufacturing method of a ring structure for reducing flash glare according to the second embodiment of the present invention.
Figure 8:
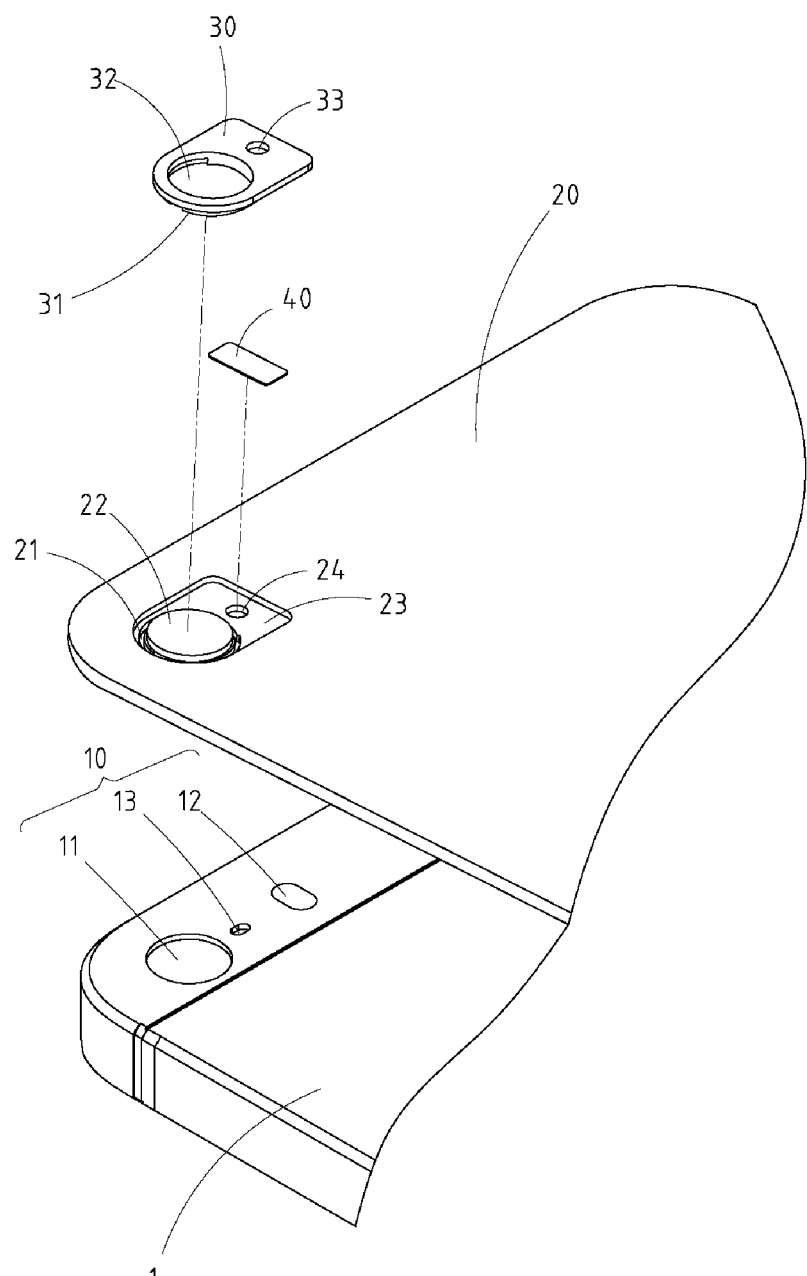
FIG. 8 is an exploded view of the ring structure for reducing flash glare according to the second embodiment of the present invention.
Figure 9:
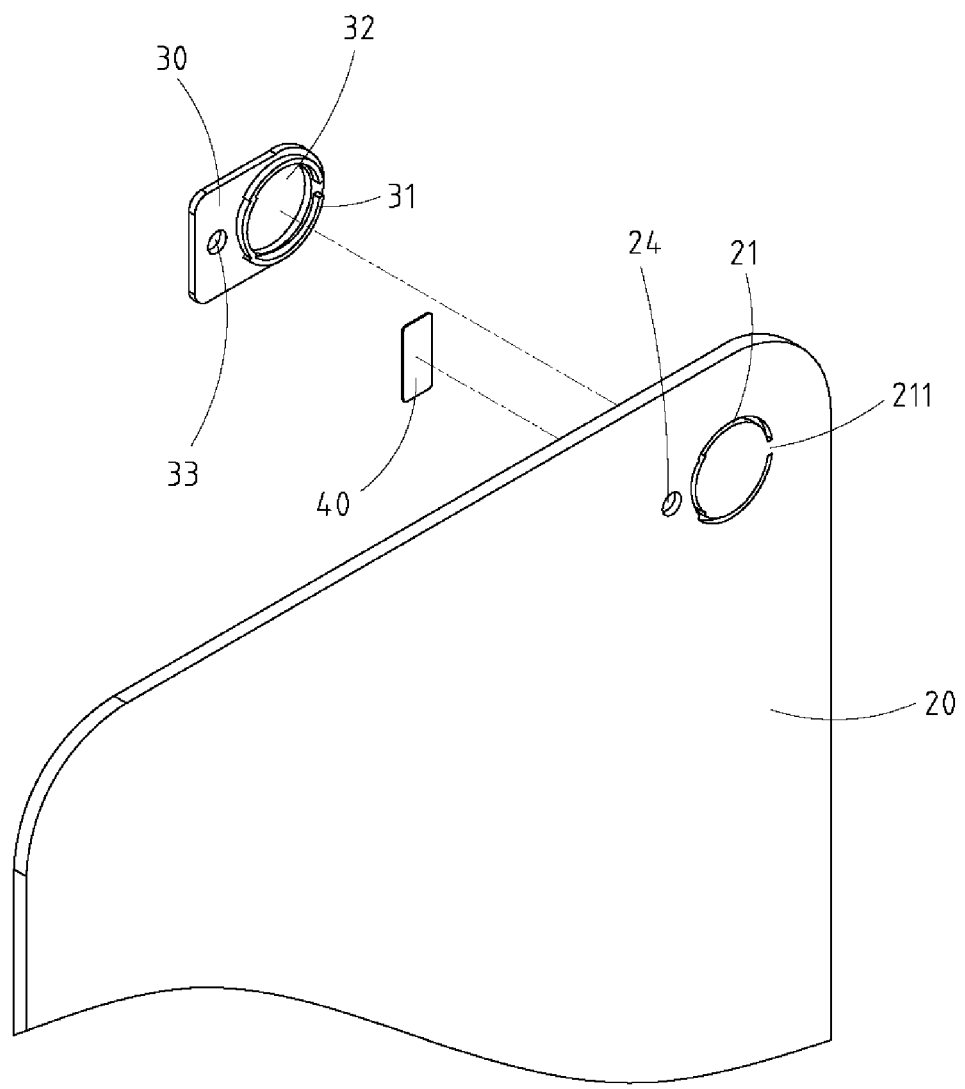
FIG. 9 is a rear exploded view of the ring structure for reducing flash glare according to the second embodiment of the present invention.

Referring to FIG. 7 through FIG. 9, there are shown in FIG. 7 a flow chart of a manufacturing method of a ring structure for reducing flash glare according to the second embodiment of the present invention, in FIG. 8 an exploded view of the ring structure for reducing flash glare according to the second embodiment of the present invention, and in FIG. 9 a rear exploded view of the ring structure for reducing flash glare according to the second embodiment of the present invention. Elements and structures in the second embodiment are denoted with the same reference numerals as their counterparts in the first embodiment are, respectively. In the second embodiment of the present invention, a manufacturing method of a ring structure for reducing flash glare is applicable to a camera module 10 with a lens 11, a flashlight 12 and a sound receiving unit 13. The manufacturing method comprises the steps as follows:

Step S11: providing a transparent substrate.

A portion of the substrate functions directly as a lens for use with a lens 11, and thus the lens-portion of the substrate must be transparent. To make the manufacturing process simple, it is practicable that a transparent substrate 20 which is fully transparent serves as the substrate, and that the transparent substrate 20 is of an area substantially equal to the area of the rear side of a mobile device 1 equipped with the camera module 10. Moreover, as the conventional cellular phones look increasingly stylish, to ensure that the cellular phone proper is visible, it is necessary that the transparent substrate 20 prevents the cellular phone from being hidden. However, the aforesaid embodiment is not restrictive of the present invention. The present invention will work, provided that, after the transparent substrate 20 has been assembled on the mobile device 1 with the camera module 10, a portion of the transparent substrate 20 corresponds in position to the camera module 10 and is transparent.

Step S12: forming a sound receiving aperture on the transparent substrate.

Referring to FIG. 8, a sound receiving aperture 24 is formed on the transparent substrate 20 with the CNC. The sound receiving aperture 24 corresponds in position to the sound receiving unit 13 of the camera module 10 whenever the transparent substrate 20 is assembled on the mobile device 1. Referring to FIG. 9, the sound receiving aperture 24 penetrates the transparent substrate 20. Hence, although the protective casing is assembled on the cellular phone, a user can record sound while shooting videos with the camera module 10. Accordingly, the scenario, in which the user cannot record sound while shooting videos with the camera module 10 because of concealment resulting from the transparent substrate 20, never occurs.

Step S13: forming on the transparent substrate a dented portion with a centrally-located raised region.

Referring to FIG. 8, a dented portion 23 with a centrally-located raised region 22 is formed on the transparent substrate 20 by the CNC. Furthermore, it is feasible for step S12 and step S13 to occur simultaneously. That is to say, the manufacturing method is configured to either execute step S12 and step S13 simultaneously, or execute step S13 and then execute step S12. The raised region 22 corresponds in position to the lens 11 whenever the transparent substrate 20 is assembled on the mobile device 1. Hence, the present invention is advantageously characterized in that a lens for hiding the lens 11 is made of the same transparent material as the transparent substrate 20 and thus dispenses with the need to manufacture a lens element for use in hiding the lens 11. The dented portion 23 is of an appropriate size to surround the raised region 22, not to correspond in position to the flashlight 12, and to correspond in position to the vicinity of the sound receiving aperture 24.

Step S14: forming a C-shaped hole in the dented portion, wherein the C-shaped hole surrounds the raised region.

Step S14 entails forming a C-shaped hole 21 in the dented portion 23 in a manner that the C-shaped hole 21 surrounds the raised region 22, such that the raised region 22 is located inside the C-shaped hole 21. With the raised region 22 corresponding in position to the lens 11, and the C-shaped hole 21 being filled with a plastic to thereby form the shading plate 30 in the subsequent step so as to prevent light rays emitted from the flashlight 12 from interfering with the lens 11, the C-shaped hole 21 must surround the raised region 22, such that the shading plate 30 formed from the filling plastic blocks light in the vicinity of the lens 11. Moreover, to ensure that light rays of the flashlight 12 will not interfere with the lens 11 through the transparent substrate 20, as shown in FIG. 9, the C-shaped hole 21 penetrates the transparent substrate 20. To dispense with the hassles of forming and positioning the raised region 22 anew, step S022 entails forming the C-shaped hole 21 rather than the O-shaped through hole for surrounding the lens 11 entirely, such that the raised region 22 is connected to the dented portion 23 through the pass 211 of the C-shaped hole 21.

Step S15: positioning a waterproof film at a sound receiving aperture such that the waterproof film corresponds in position to a sound receiving unit.

Referring to FIG. 8, a waterproof film 40 is mounted on the sound receiving aperture 24 to prevent water from intruding into the protective casing through the sound receiving aperture 24 and yet allow sound to reach the sound receiving unit 13 through the sound receiving aperture 24. The waterproof film 40 is made of a material penetrable by sound but not water or moisture, such that the sound receiving aperture 24 is waterproof. Moreover, the waterproof film 40 allows sound to travel to the sound receiving unit 13.

Step S16: injecting a plastic to fill a C-shaped hole and thereby form a shading plate on the transparent substrate.

In this embodiment, the waterproof box structure manufacturing method entails injecting, by means of insert molding, a plastic to fill the C-shaped hole formed in step S14.

Referring to FIG. 8, the shading plate 30 is separated from the transparent substrate 20 for the sake of schematic illustration of the shading plate 30; hence, it is simply not true that the waterproof box structure manufacturing method entails forming the shading plate 30 and then mounting the shading plate 30 on the transparent substrate 20. The plastic fills the C-shaped hole 21 and the dented portion 23 except the raised region 22, such that the position-limiting effect of the C-shaped hole 21, the raised region 22 and the dented portion 23 facilitates the formation of the shading plate 30. Referring to FIG. 8 and FIG. 9, upon completion of the filling process of the plastic, the plastic is confined to the C-shaped hole 21, the raised region 22 and the dented portion 23, such that the shading plate 30 forms a C-shaped flange 31 and a through hole 32. Furthermore, a portion of the shading plate 30 corresponds in position to the sound receiving aperture 24, surrounds the sound receiving aperture 24, and has a penetrating hole 33, such that sound penetrates the shading plate 30 and the transparent substrate 20 to reach the sound receiving unit 13. The C-shaped flange 31 corresponds in shape and dimensions to the C-shaped hole 21 and is aligned with the C-shaped hole 21, such that the C-shaped flange 31 is received in the C-shaped hole 21 to fix the shading plate 30 to the transparent substrate 20. The through hole 32 corresponds in position to and fits tightly with the raised region 22 from outside. The through hole 32 is of larger dimensions than the lens 11. That is to say, the through hole 32 is of a larger diameter than the lens 11.

With the dented portion 23 corresponding in position to the vicinity of the sound receiving aperture 24, the filling plastic also covers the waterproof film 40 positioned on the sound receiving aperture 24, such that the waterproof film 40 is fixed between the transparent substrate 20 and the shading plate 30.

In this embodiment, the sound receiving unit 13 in the camera module 10 on the mobile device 1 requires the sound receiving aperture 24 for use in sound reception, whereas the waterproof film 40 renders the sound receiving unit 13 and the sound receiving aperture 24. However, it is still practicable that the step of forming the C-shaped hole and the step of forming the waterproof film 40 take place simultaneously. The sound receiving aperture 24 and the waterproof film 40 can be formed without changing the original manufacturing process greatly.

As a result of the manufacturing method, the ring structure for reducing flash glare is advantageously characterized in that: the C-shaped hole 21 corresponds in position to the lens 11 and surrounds the lens 11 as soon as the ring structure for reducing flash glare is assembled on the mobile device 1 with the camera module 10 with the lens 11, the flashlight 12 and the sound receiving unit 13, such that the shading plate 30 filled in the C-shaped hole 21 hides the vicinity of the lens 11; hence, light rays, which are emitted from the flashlight 12, travel toward the lens 11 through the transparent substrate 20 but are blocked by the shading plate 30, and in consequence the light rays do not interfere with the lens 11; furthermore, when a user is shooting videos with the camera module 10, sound is admitted into the sound receiving aperture 24 to penetrate the transparent substrate 20 and the shading plate 30 and eventually reach the sound receiving unit 13, thereby effectuating sound reception.

The present invention is disclosed above by embodiments. However, persons skilled in the art should understand that the embodiments are illustrative of the present invention only, but should not be interpreted as restrictive of the scope of the present invention. Hence, slight changes and modifications made to the aforesaid embodiments by persons skilled in the art without departing from the spirit and scope of the present invention should fall within the scope of the present invention. Accordingly, the legal protection for the present invention should be defined by the appended claims.

What is claimed is:

1. A manufacturing method of a ring structure for reducing flash glare, the ring structure is assembled on a camera module with a lens and a flashlight, the manufacturing method comprising the steps of:
    providing a transparent substrate;
    forming a C-shaped hole on the transparent substrate; and
    injecting a plastic to fill the C-shaped hole and thereby forming a shading plate on the transparent substrate,
    wherein, after the ring structure for reducing flash glare has been assembled on the camera module, the shading plate is positioned beside the flashlight,
    wherein a pass of the C-shaped hole extends away from the flashlight to prevent the flashlight in operation from interfering optically with the lens of the camera module.

2. The manufacturing method of claim 1, wherein the camera module further comprises a sound receiving unit, the manufacturing method further comprises:
    forming a sound receiving aperture on the transparent substrate; and
    positioning a waterproof film at the sound receiving aperture such that the waterproof film corresponds in position to the sound receiving unit,
    wherein the step of injecting a plastic to fill the C-shaped hole and thereby form a shading plate on the transparent substrate entails fixing the waterproof film between the transparent substrate and the shading plate.

3. The manufacturing method of claim 1, wherein the step of forming the C-shaped hole on the transparent substrate further comprises:
    forming on the transparent substrate a dented portion with a centrally-located raised region; and
    forming the C-shaped hole in the dented portion, wherein the C-shaped hole surrounds the raised region.

4. The manufacturing method of claim 3, wherein the step of injecting the plastic to fill the C-shaped hole and thereby forming the shading plate on the transparent substrate entails filling the plastic in the C-shaped hole and the dented portion except the raised region.

5. The manufacturing method of claim 1, wherein, in the step of injecting the plastic to fill the C-shaped hole and thereby forming the shading plate on the transparent substrate, the plastic is injected by inserting molding.

6. A ring structure for reducing flash glare, the ring structure being assembled on a camera module with a lens and a flashlight, the ring structure comprising:
    a transparent substrate with a C-shaped hole, the C-shaped hole corresponding in position to the lens and surrounding the lens, the C-shaped hole having a pass extending away from the flashlight; and
    a shading plate with a through hole and a C-shaped flange, the C-shaped flange being disposed at a rim of the through hole, the C-shaped flange corresponding in dimensions to the C-shaped hole to not only be received in the C-shaped hole but also fix the shading plate to the transparent substrate, wherein the through hole is of larger dimensions than the lens, and the shading plate is positioned beside the flashlight as the ring structure for reducing flash glare is assembled.

7. The ring structure of claim 6, wherein the transparent substrate has a sound receiving aperture, the camera module further comprises a sound receiving unit, the ring structure further comprises a waterproof film disposed between the transparent substrate and the shading plate to cover the sound receiving aperture, and the shading plate surrounds the sound receiving aperture, the sound receiving aperture corresponding in position to the sound receiving unit.

8. The ring structure of claim 6, wherein the transparent substrate further has a dented portion provided therein with the C-shaped hole and a raised region enclosed within the C-shaped hole.

9. The ring structure of claim 8, wherein the shading plate corresponds in shape to the dented portion and is received in the dented portion.

10. The ring structure of claim 8, wherein the through hole of the shading plate corresponds in position to and fits tightly with the raised region from outside.

11. The ring structure of claim 6, wherein the shading plate is fixed onto the transparent substrate by means of insert molding.

* * * * *